Feb. 7, 1928.
N. BAUML
1,658,587
AUTOMOTIVE ACCESSORY
Filed March 9, 1927    2 Sheets-Sheet 2
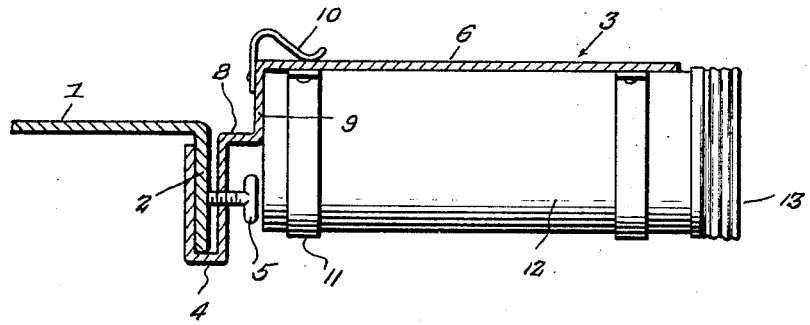
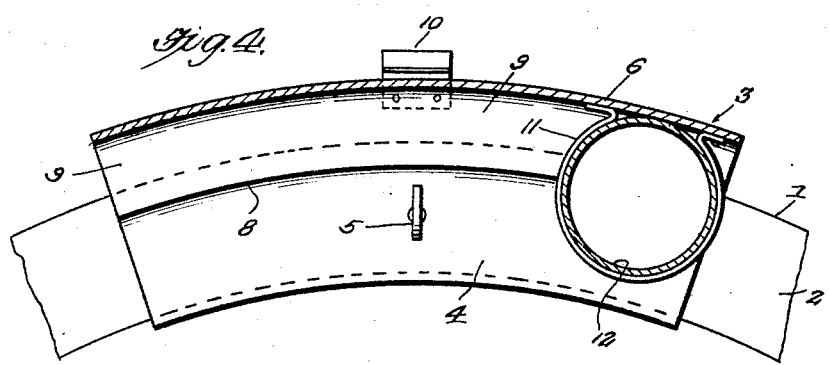
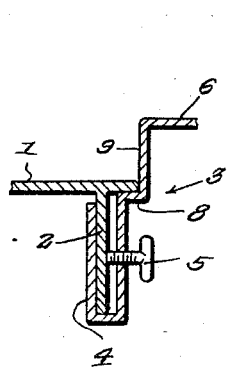
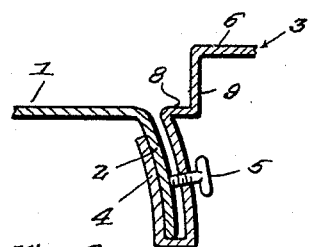
Inventor
Nathan Bauml,
By Clarence A. O'Brien
Attorney Patented Feb. 7, 1928.

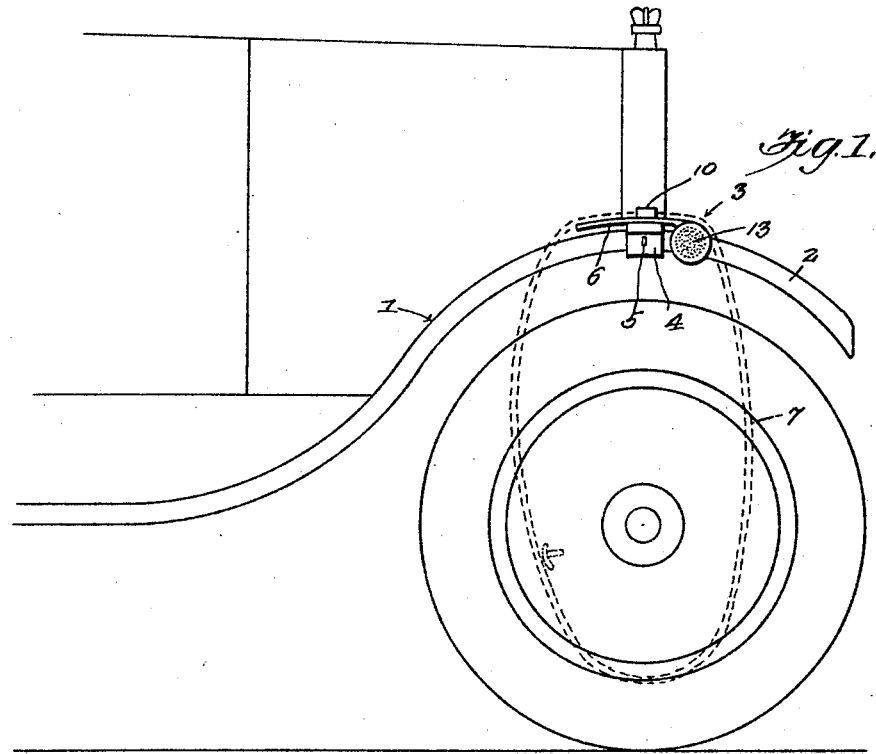
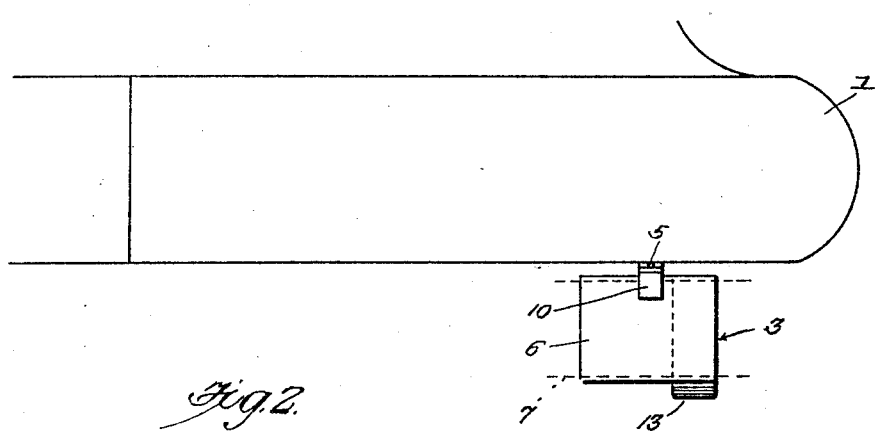

1,658,587

UNITED STATES PATENT OFFICE.

NATHAN BAUML, OF FOXBORO, MASSACHUSETTS.

AUTOMOTIVE ACCESSORY.

Application filed March 9, 1927. Serial No. 174,087.

The present invention is directed to an improved automotive accessory particularly adapted for use in connection with the repair of pneumatic tire inner tubes.

Briefly, the improved construction embodies a miniature working shelf or table provided with clamping means whereby it may be connected with an appropriate support which, in most instances will be one of the fenders of the automobile.

I aim particularly to provide an exceptionally simple and inexpensive contrivance of this class, wherein the table is shaped to permit the inner tube to be laid in a flat straight position thereon, in order that the defect may be clearly observed and repaired by cementing, vulcanizing, patching or the like.

An important feature of the invention is the provision of novel clamping means which is such as to permit it to be connected to the depending flange on the fender.

Another feature is a resilient retaining clip on the upper side of the miniature table which is adapted to engage the tube and to aid in maintaining it in place.

Another feature of the invention is an accessory containing carton which is strapped to the bottom of the table and which has its open end and closing cap extending outwardly beyond one edge of the table, in order to permit access to be had to the interior for obtaining the cement, patches, vulcanizing tools, etc.

Other features and advantages of the invention will become apparent from the following description and drawings.

In the accompanying drawings:

Figure 1 is a side view showing a portion of an automobile and its fender and front wheel, together with the attachment in place.

Figure 2 is a top plan view of the same.

Figure 3 is a transverse section.

Figure 4 is a longitudinal section through the attachment.

Figures 5 and 6 are detail sectional views, of slightly different embodiments of fenders showing the preferred embodiments of clamps connected thereto.

As indicated, the invention is in the form of an attachment, such as is adapted to be connected to an automobile fender. In the drawings, I have represented the fender by the reference character 1 and the usual outer marginal flange by the reference character 2. By preference I clamp the attachment 3 to this flange. The attachment comprises a substantially U-shaped clamp 4, which engages the flange as shown plainly in Figure 3. This clamp includes the retaining screw 5 and in practice, a suitable felt protecting pad, (not shown) is provided, for preventing marring of the polished surface of the fender flange. I might state here that this clamp may be comparatively short or it may extend the full length of the curved supporting table 6 to which it is connected. For example, in Figure 1 I have shown a short clamp, while in Figure 4 I have shown a long clamp which extends the full length of the table. The table, which has been designated as a miniature tool supporting table is somewhat flat and curved longitudinally so that the inner tube 7 (see Figure 1) may be laid across the same somewhat in the manner indicated in dotted lines in Figure 1. The clamp 4 is connected to the table through the medium of the right angular portion including parts 8 and 9. Connected to the portion 9 is the resilient retaining clip 10, which cooperates with the table in holding the tube in position thereon. Connected to the under side of the table by metal straps 11 is a container or carton 12, having a removable screw closure 13, on the outer open end. It will be noted that this end extends beyond the adjacent edge of the table, in order that the cover may be readily applied and removed.

The only distinction between the forms of the invention shown in Figures 1 to 4 inclusive and that shown in Figures 5 and 6 is in the configuration of the clamping means. It is well known, of course, that various kinds of fenders on present day automobiles vary in design. Consequently the clamping means must be varied, in order to operate therewith in an efficient manner. For instance, in Figure 5, we find an overhanging edge on the fender, whereas in Figure 6 we find the flange curved or of arcuate form rather than of straight form as shown in Figure 3. Otherwise the invention is identical with that already described. Hence, the same reference characters apply to all parts throughout the different views.

It is believed that by considering the description in connection with the drawings, it will be plain that I have evolved and produced an exceptionally inexpensive and simple automotive contrivance in the form of an attachment which can be applied to the fender and which will overcome the objectionable practice of repairing tubes, as is followed at the present time. It is well known that it is usually inconvenient to repair an inner tube when it develops a leak or has a defect, which must be overcome. This is particularly true when one is touring. I have noticed that many persons resort to the objectionable plan of laying the tube down on the ground and kneeling down in the dirt and attempting to repair it by applying a patch or vulcanizing it there. Others take the hot vulcanizing implement and attach it to the tube and then throw it over the fender. This naturally mars the paint and is objectionable especially because of this. Many other persons attempt to lay the tube on the running board. This is objectionable, however, in that it slips, gets out of place, and consumes a good deal of patience and time. The present invention, however, could be readily applied to the fender and provides a nice little table to work on. It is convenient and efficient and exceptionally inexpensive. All of the accessories necessary in the work can be carried in the box and the box together with the clamping means and table form one complete unit, which can be readily applied and removed. It can, in fact, be readily carried in the tool box and has further advantages plain to those familiar with inventions of this kind. Therefore a more lengthy description is thought unnecessary.

While the preferred embodiment of the invention has been shown and described, it is to be understood that minor changes coming within the field of invention claimed may be resorted to, if desired.

I claim:

1. As a new product of manufacture, a pneumatic tube repair device comprising a miniature table adapted to receive and support the defective portion of the tube, clamping means carried by said table and adapted to be connected with a support, and retaining means on the table adapted to aid in holding the tube in place thereon.

2. As a new product of manufacture, an automotive accessory of the class described comprising a miniature substantially flat longitudinally bowed supporting table for the tube, a resilient retaining clip associated with said table, and a clamping device carried by one edge thereof and adapted for connection to a relatively stationary part of an automobile.

3. As a new product of manufacture, an automotive accessory of the class described comprising a longitudinally bowed substantially flat plate adapted to operate as a tube supporting table, a substantially U-shaped fender engaging clip, a retaining screw carried by said clamp, a tube retaining clip carried by said table, and an accessory containing box strapped to the under side of the table and extending transversely across the same and having its outer end closed by a removable cover, said cover being located at a point beyond the adjacent edge of the table to permit it to be easily applied and removed.

In testimony whereof I affix my signature.

NATHAN BAUML.